United States Patent [19]
Peter et al.

[11] 3,847,493
[45] Nov. 12, 1974

[54] DOUBLE CONICAL HUB-TO-SHAFT CONNECTION

[75] Inventors: Oskar E. Peter, Brackenheim; Lothar Peter, Guglingen, both of Germany

[73] Assignee: Oskar E. Peter, Brackenheim, Germany; by said Lothar Peter

[22] Filed: July 24, 1973

[21] Appl. No.: 382,130

[30] Foreign Application Priority Data
May 28, 1973 Germany.............................. 2327118

[52] U.S. Cl.................. 403/370, 403/371, 403/374
[51] Int. Cl............................................... F16d 1/06
[58] Field of Search .......... 403/366, 369, 370, 371, 403/374, 288, 243, 344; 285/23, 196, 338, 346, 321; 85/4

[56] References Cited
UNITED STATES PATENTS

| | | | |
|---|---|---|---|
| 3,656,785 | 4/1972 | Lothar................ | 403/370 |
| 3,679,247 | 7/1972 | Peter et al. ......... | 403/366 |
| 3,717,367 | 2/1973 | Peter et al. ......... | 403/366 |
| 3,720,429 | 3/1973 | Friedrichs et al.... | 403/371 |
| 3,776,651 | 12/1973 | Peter et al. ......... | 403/370 |

FOREIGN PATENTS OR APPLICATIONS

| | | | |
|---|---|---|---|
| 1,231,493 | 12/1966 | Germany.............. | 403/369 |
| 1,169,726 | 5/1964 | Germany.............. | 403/369 |
| 1,165,941 | 3/1964 | Germany.............. | 403/369 |
| 1,099,806 | 2/1961 | Germany.............. | 403/369 |
| 1,162,640 | 2/1964 | Germany.............. | 403/369 |

*Primary Examiner*—Jordan Franklin
*Assistant Examiner*—Conrad L. Berman
*Attorney, Agent, or Firm*—Flynn & Frishauf

[57] ABSTRACT

In connecting a hub to a shaft, spaced outer and inner sleeves are provided with outer and inner cylindrical surfaces separated by insert elements which have an outwardly divergent conical surface. The sleeves are formed with a matching conical surface, at a cone angle in excess of the self holding angle. Upon tightening the conical elements against each other, conical surfaces thereof will slide against the conical surfaces of the matching cylindric element. The elements are formed with radially projecting outer flanges to fit over the edge of one of the sleeves, the other sleeve being of longer axial extent than the position of the elements, and formed with a groove in which a snap ring fits, to hold the elements, and the sleeves together in one assembly, from which no parts can become accidentally separated.

9 Claims, 1 Drawing Figure

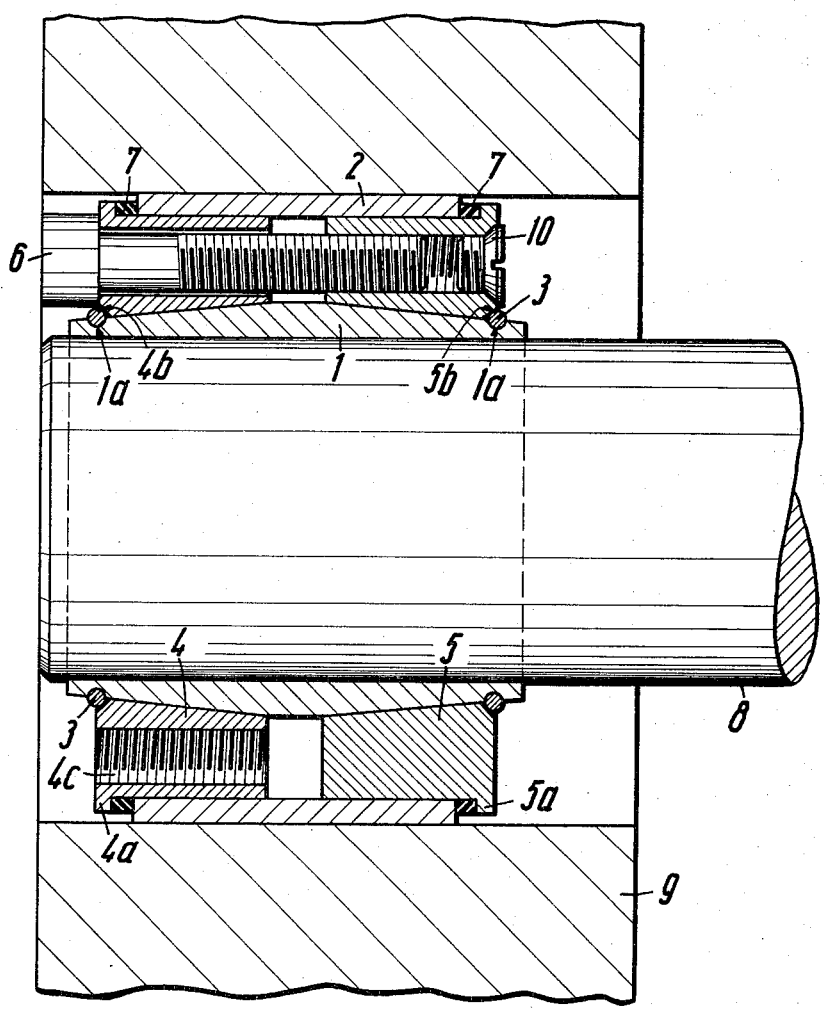

DOUBLE CONICAL HUB-TO-SHAFT CONNECTION

The present invention relates to a hub-to-shaft connection, and more particularly to a friction interconnection between a hub and the shaft in which conical elements are utilized, symmetrically located, and so arranged that the entire assembly is retained together, so that parts cannot be lost, that the assembly can be easily mounted, and is capable of transmitting substantial torques.

Various types of hub-to-shaft connections have been proposed, see: applicant's U.S. Pat. Nos. 3,656,785; 3,679,247; 3,717,367; 3,776,651, and applicant's copending U.S. Pat. application Ser. No. 330,744, filed Feb. 8, 1973. Double-conical clamping or tensioning connections between hubs and shafts have the advantage that, during tightening, there is no axial movement between the hub and the shaft, so that the hub can be accurately mounted and adjusted on the shaft, to provide not only excellent centricity, but axial alignment as well. Eliminating axial shifting movement during tightening of the connection permits leaving only residual frictional forces within the hub-to-shaft connection between the conical surfaces thereof, and the contacting engaged conical clamping rings, each matching engagement surface being tensioned with respect to each other, and subjected to only one frictional contact with the engaging surface, so that friction has to be overcome during tightening, of only one surface for each side of the conical engagement. The cone angle is so selected that it is above that of the self holding, or self binding angle, to permit removal of the hub-to-shaft connection after release of the axial clamping force. As a result, the transmission relationships of the clamping rings are low, and in order to provide effective clamping force, a plurality of tightening screws are provided, arranged on a circumferential ring, that is, in planetary arrangement, in order to permit transmission of high torques. Locating a plurality of clamping or tightening screws circumferentially, in a circle, around the hub-to-shaft connection requires a substantial number of bores, and tapped holes in the conical rings. This increases manufacturing costs. Further, assembling the connection between a hub and a shaft is comparatively time consuming and expensive, since a number of tightening screws have to be tightened, in a certain cross over pattern, by means of torque wrenches, for a certain design tightening torque, so that the hub-to-shaft connection will be capable of transmitting its design torque.

Previously proposed connections have utilized eight corresponding conical surfaces, in engagement with each other, which increases manufacturing costs, since the conical surfaces have to be accurately made, with high precision, and the manufacture of conical surfaces at certain angles is much more expensive than of cylindrical surfaces. The conical surfaces must be accurately concentric, so that the bearing force of the surfaces with respect to each other will, at all sides, be completely uniform, by providing for exact centricity with respect to the axis of the shaft to be connected to the hub.

It is an object of the present invention to provide a hub-to-shaft connection in which the advantages of double-conical connections are retained but which is easier to make, and with less expense, than previously proposed hub-to-shaft connections; and which, further, permits transmission of equal, or even higher torques, increasing the life of the shaft and the hub which are being connected, and providing for equal, or even improved centricity of the hub and the shaft.

SUBJECT MATTER OF THE PRESENT INVENTION

Briefly, outer and inner sleeves having outer and inner cylindrical surfaces are provided, the cylindrical surfaces fitting against the inside of the hub and over the outside of the shaft, respectively. The sleeves are radially tightened with respect to each other by interposed insert elements which have at least one conical surface, preferably an inwardly facing conical surface, which matches a conical surface formed at the outer side of the inner sleeve. The outer surfaces of the insert elements are cylindrical, and fit within a matching cylindrical surface on the outer ring.

In a preferred form of the invention, the outer ring is actually of slightly lesser extent than the insert elements which, themselves, are ring-shaped when assembled together; the space there between is filled by a ring of resiliently compressible material. The inner ring is of greater axial extent than the insert elements, and formed with a groove adjacent its edge in which a snap ring fits, which holds the elements together, in an inseparable assembly, thus preventing accidental loss of parts forming the hub-to-shaft connection.

The invention will be described by way of example with reference to the accompanying drawings, wherein:

The single FIGURE is a schematic transverse sectional view of a hub-to-shaft connection in accordance with the present invention.

The FIGURE illustrates the connection before it is tightened, but inserted between a hub (9) and a shaft (8). It includes an inner sleeve (1) which preferably is a closed inner sleeve, having an inner cylindrical surface fitting over the shaft. The outer surface of the sleeve is formed with oppositely directed, outwardly diverging conical surfaces. Adjacent the edge thereof, the sleeve (1) is formed with circumferential ring grooves (1a) in which slit, resilient holding rings (3) are snapped. Holding rings (3) provide for axial holding of two conical compression rings (4, 5). The compression rings (4, 5) have an outer projecting flange (4a, 5a) formed thereon, projecting radially outwardly. At the inner end face, the rings (4, 5), are relieved or chamfered by being cut off, preferably with a relief cut taken at 45° as at 4b and 5b with respect to the axis of the shaft, to form an engagement surface with the snap rings (3).

An outer sleeve (2) is embedded between the flanges (4a, 5a) projecting from rings (4, 5). Sleeve (2) has both inner and outer cylindrical surfaces. It is separated from the projecting flanges by elastic rings (7), made of elastically compressible material such as plastic, rubber, or the like to permit the deformation, at least in axial direction. The rings (4, 5), are formed with matching axial bores, arranged around the circumference, into which bolts (6) fit, so that the rings (4, 5), can be tightened with respect to each other. Additionally, ring (4) is formed with tapped bores (4c) which do not have matching bores in ring (5), so that screws (6) can be screwed into the blind bores (4c) and press the rings (4, 5) away from each other when the hub-to-shaft connection is to be loosened. The inner opening of the bores in ring (5) is closed up by flathead screws (10), which may have plastic or other elastic coating, to provide a liquid tight connection and close off the bore into which screw (6) passes. Of course, the bore in the ring (5) can also be made as a blind bore, but for manufacturing convenience, it may be easier to include a closing off screw (10).

The holding snap ring (3), which seats in the circumferential grooves (1a) of the closed inner sleeve (1) retains the connection assembly in one axially and radially movable unit which, however, is held together so that the parts cannot be lost. The clamping screws (6), which are preferably recessed-head screws such as Allenhead bolts, when tightened, provide for sliding movement of the conical elements against the conical surface on the inner sleeve. To assemble the unit and provide a tight hub-to-shaft connection, the bolts (6), arranged circumferentially around shaft (8), in the form of a planetary arrangement, are tightened in a criss-crossing pattern; the double conical inner sleeve (1) will be subjected to increasing radial pressure on shaft (8), and the cylindrical outer sleeve (2) will be subjected to increased radial pressure bearing against a bore of the hub (9). Substantial torques, and intermittent, dynamic loading can be transferred thereby.

The conical angle of inner sleeve (1) and the ring elements (4, 5), is preferably so selected that it is above that of the self binding angle, to permit ready release of the surfaces from each other upon introducing of pressure by screwing bolts into the bores (4c), and pressing the two ring-elements (4, 5), away from each other. The self binding conical surfaces of the inner tension ring, in combination with the conical elements permit transmission of high torques and substantial increase of radial pressure. The outer cylinder is a hollow cylinder and can be easily manufactured on fully automatic screw machinery, and then polished both at its inner and outer surfaces to a mirror finish. Experiments have shown that hardly any frictional resistance arises between the bore of the outer sleeve and the cylindrical surface of the rings (4, 5), when the assembly is tightened. This permits substantial increase of the tightening force, and thus increase of the torque being transmitted by the assembly. The conical, divergent surfaces of the closed inner ring, in combination with the conical rings (4, 5), provide a particularly good load distribution, and decrease of notching forces, and thus an increase in the strength of the shaft. The relief, for example of 45° at the outer surfaces of the conical rings (4, 5), is placed in the region of their greatest thickness, so that there is hardly any decrease in strength, while provided a bearing surface for the safety snap rings (3). Upon loosening of the hub-to-shaft connection, the rings (3) can be pressed in the circumferential grooves of the inner sleeve (1).

The bores extending axially through the entire assembly, may be closed off by means of sealing screws 10, particularly upon interposition of a sealing washer or gasket, or a sealing substance, to provide a liquid tight connection between the shaft and the hub.

The inner sleeve, as well as the outer sleeve can be formed as closed sleeves; the inner, or outer, sleeves may also be formed as longitudinally, or spirally slit sleeves, in which case, to provide for fluid tight connection, the split crack can be filled with a plastic or other sealing compound.

The hub-to-shaft connection as shown in the drawings and as explained in detail has been illustrated with the double-conical surface placed on the inner sleeve (1). The inventive concept can also be realized by placing the double-conical surface on the outer sleeve (2), and forming matching conical surfaces at the outer surfaces of inserts (4, 5). Rings (7) are preferably made of plastic or rubber, to provide for axial holding of the outer ring on the assembly; the arrangement can be reversed, and the flanges directed radially inwardly, with snap rings (3) located in an outer groove. Rather than using a plastic or rubber ring (7), a ring-shaped thin metal disc, radially undulating, may also be used. Various other changes and modifications may be made within the scope of the inventive concept.

We claim:

1. Double-conical hub-(9)to-shaft (8) connection comprising
    an outer sleeve (2) having an outer surface bearing against the inner surface of the hub (9);
    an inner sleeve (1) having an inner surface bearing against the outer surface of the shaft (8) the other surface of one of said sleeves being double-conical, with the thicker portion of the cone centrally located, and the other surface of the other sleeve being cylindrical;
    a pair or ring-shaped spreader elements (4, 5) having one cylindrical surface fitting against said cylindrical surface in the other sleeve and one conical surface fitting against that conical surface of said one sleeve;
    the cone angle of said conical surfaces being greater than the self-binding angle;
    the outer end portions of said spread elements (4, 5) being formed with a radially projecting flange (4a, 5a) projecting towards one of said sleeves;
    rings (7) of elastically compressible material being located between the projecting flange (4a, 5a) of the respective spread element and the respective end surfaces of the adjacent sleeve (2);
    a circumferential groove (1a) formed in the second of said sleeves, and a compressible spring-ring (3) located in said groove and securing said elements and said sleeves in a normally inseparable assembly.

2. Double-conical hub-to-shaft connection according to claim 1, wherein the outer sleeve has inner and outer cylindrical surfaces;
    the inner sleeve has an inner cylindrical surface bearing against the outer surface of the shaft and conical surfaces are formed on the outer surface of the inner sleeve; and
    the spreader elements have outer cylindrical surfaces and inner conical surfaces.

3. Double-conical hub-to-shaft connection according to claim 1, wherein the axial extent of the sleeve (2) overlapped by the projecting flanges (4a, 5a) of the spreader elements is less than the axial length of said spreader elements of both spreader elements when connected and tightened together.

4. Double-conical hub-to-shaft connection according to claim 3, wherein the second of said sleeves has an axial extent which is longer than the axial extent of both said spreader elements when assembled and tightened together.

5. Double-conical hub-to-shaft connection according to claim 1, wherein the circumferential groove is formed adjacent the end portion of the second of said sleeves;

and the spreader elements have a chamfered, relieved corner adjacent said groove, the compressible spring ring located in said groove fitting against said chamfered surface.

6. Double-conical hub-to-shaft connection according to claim 5, wherein the chamfered surface is a relief cut at approximately 45° with respect to the axis of the hub-to-shaft connection.

7. Double-conical hub-to-shaft connection according to claim 1, wherein said spreader elements are formed with axially extending bores, passing, in alignment, through both said elements;

clamping screws are inserted in said bores connecting said spreader elements, the clamping screws being of lesser length than both said elements, when tightened and assembled together;

and sealing plug means (10) closing off the bores in which said clamping screws are screwed.

8. Double-conical hub-to-shaft connection according to claim 7, wherein said plug means comprises sealing screws screwed into said bores.

9. Double-conical hub-to-shaft connection according to claim 7, further comprising tapped bores extending only through one of said elements to permit insertion of said clamping screws in said tapped bores, to bear against the inner end face of the other of said elements, and separate said elements from each other.

* * * * *